US011948152B2

(12) United States Patent
Yang et al.

(10) Patent No.: US 11,948,152 B2
(45) Date of Patent: *Apr. 2, 2024

(54) SYSTEM AND METHOD FOR MAKING PURCHASE PAYMENT AFTER PAYMENT FAILURES

(71) Applicant: Affirm, Inc., San Francisco, CA (US)

(72) Inventors: Youyou Yang, Sunnyvale, CA (US); Daniel Kaufman, San Francisco, CA (US); Edward Oistacher, San Francisco, CA (US)

(73) Assignee: Affirm, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,216

(22) Filed: Jun. 15, 2022

(65) Prior Publication Data

US 2022/0309508 A1 Sep. 29, 2022

Related U.S. Application Data

(63) Continuation of application No. 16/244,062, filed on Jan. 9, 2019, now Pat. No. 11,397,951.

(60) Provisional application No. 62/615,153, filed on Jan. 9, 2018.

(51) Int. Cl.

*G06Q 20/00* (2012.01)
*G06Q 20/24* (2012.01)
*G06Q 20/40* (2012.01)

(52) U.S. Cl.

CPC ........... *G06Q 20/407* (2013.01); *G06Q 20/24* (2013.01)

(58) Field of Classification Search

None

See application file for complete search history.

(56) References Cited

U.S. PATENT DOCUMENTS

| | | | | |
|---|---|---|---|---|
| 6,629,081 | B1 * | 9/2003 | Cornelius | G06Q 20/04 705/30 |
| 9,456,085 | B1 * | 9/2016 | Perdue | H04M 3/5232 |
| 2001/0032183 | A1 * | 10/2001 | Landry | G06Q 20/14 705/40 |
| 2003/0033245 | A1 * | 2/2003 | Kahr | G06Q 20/04 705/36 R |
| 2003/0065642 | A1 * | 4/2003 | Zee | G06Q 50/184 |

(Continued)

OTHER PUBLICATIONS

Credits and debits on the Internet, IEEE (Year: 1997).*

(Continued)

*Primary Examiner* — Bruce I Ebersman

(74) *Attorney, Agent, or Firm* — Burr & Forman, LLP

(57) ABSTRACT

When a loan payment failure occurs, a loan server can retry a payment from a client's financial institution sources rather than immediately charging the client for the payment failure. The payment retry is scheduled on a Friday that is at least three days after the payment failure. If a payment failure from the financial institution sources to the loan server occurs between a Friday and the following Monday the payment retry by the loan server to the financial institution sources will occur on the first following Friday and if the payment failure occurs on Tuesday, Wednesday or Thursday, the payment retry will occur on the second following Friday which is the Friday of the following week from the failure date.

15 Claims, 5 Drawing Sheets

(56) References Cited

U.S. PATENT DOCUMENTS

| | | | | |
|---|---|---|---|---|
| 2005/0119970 | A1* | 6/2005 | Inamochi | G07F 19/20 705/39 |
| 2005/0125321 | A1* | 6/2005 | Gerstner | G06Q 20/385 705/42 |
| 2007/0198407 | A1* | 8/2007 | Winter | G06Q 40/02 705/40 |
| 2008/0183621 | A1* | 7/2008 | Evans | G06Q 20/29 705/40 |
| 2008/0249931 | A1* | 10/2008 | Gilder | G06Q 20/04 705/39 |
| 2011/0178902 | A1 | 7/2011 | Imrey et al. | |
| 2013/0117185 | A1* | 5/2013 | Collison | G06Q 20/385 705/67 |
| 2013/0218727 | A1* | 8/2013 | Lutnick | G06Q 30/0635 705/26.81 |
| 2013/0297492 | A1* | 11/2013 | Ertresvaag | G06Q 20/389 705/39 |
| 2014/0249901 | A1* | 9/2014 | Qawami | G06Q 20/386 705/14.17 |
| 2014/0289118 | A1* | 9/2014 | Kassemi | G06Q 20/388 705/44 |
| 2015/0193776 | A1* | 7/2015 | Douglas | G06Q 20/4012 705/16 |
| 2016/0110712 | A1 | 4/2016 | Howe | |
| 2016/0253651 | A1* | 9/2016 | Park | G06Q 20/34 705/39 |
| 2017/0221066 | A1* | 8/2017 | Ledford | G06Q 20/4016 |
| 2018/0276628 | A1* | 9/2018 | Radiotis | G06F 9/546 |
| 2018/0341947 | A1* | 11/2018 | Hua | G06Q 20/3278 |

OTHER PUBLICATIONS

The Supplier Management and Approval in Reverse Trade Card: An Electronic Payment System on the B2B, IEEE (Year: 2010).*

Financial Forecasting and Analysis for Low-Wage Workers by arXiv.org (Year: 2018).

* cited by examiner

Payment retries canceled

Hi Alexander,

The following payment retries have been canceled because your payment instrument Visa *7820** appears to have expired, been closed, or otherwise become invalid

CANCELED PAYMENT RETRIES

| | |
|---|---|
| Scheduled: Jan 1, 2016 | $37.49 |
| Loan ID: 9430-DKAL | Amex *3300 |
| Scheduled: Mar 1, 2016 | $37.49 |
| Loan ID: 9430-DKAL | Amex *3300 |

SYSTEM AND METHOD FOR MAKING PURCHASE PAYMENT AFTER PAYMENT FAILURES

CROSS-REFERENCE TO RELATED APPLICATIONS

This application is a continuation of U.S. patent application Ser. No. 16/244,062, “System and Method for Making Payments After Payment Failures” filed Jan. 9, 2019, which claims priority to U.S. Provisional Patent Application No. 62/615,153, “System And Method For Making Payments After Payment Failures” filed on Jan. 9, 2018 which is hereby incorporated by reference in its entirety.

BACKGROUND

When customers make purchases from merchants, the typical transaction involves selecting the goods or services and paying for them with traditional means such as cash, checks, and fund transfers. For some larger purchases, a consumer may require multiple payments to pay for the purchases. A consumer may make monthly payments until the loan amount is paid off. These payments may include loan interest payments. When there is a payment failure, many loan providers issue late fees for these payment failures. These late fees can be very unpopular to consumers. What is needed is an alternative system and method for automatically obtaining payments after a payment failure without charging late fees to customers.

DETAILED DESCRIPTION

Figure 1:
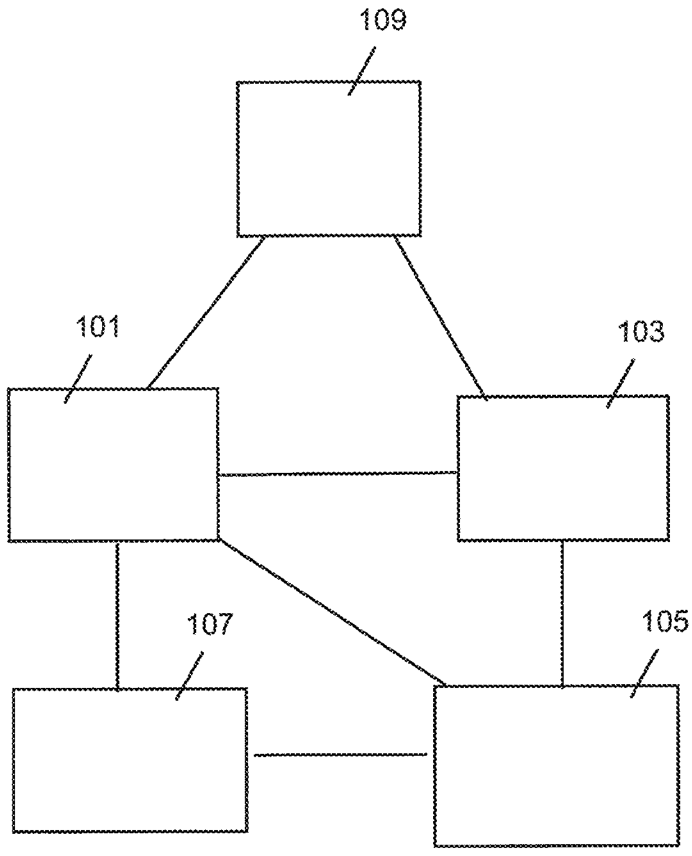
FIG. 1 illustrates a block diagram of a computer system for making purchase payments.

Mobile computing payment systems such as Affirm have made it easier for system users to purchase goods without cash or credit cards. With reference to FIG. 1, a payment system can include a computer loan system server 101 that provides an online payments system for purchasing goods by users' computing device 103. The payment loan system server 101 can communicate and transfer funds with financial institution servers 105 of the loan holders and loan holder users computing devices 103. The loan system server 101 can run software that provides the financial services through a network to system users through the user computing devices running payment software such as app software running on a mobile computing devices 103. The computing device software can be configured by system users through a software user interface. Alternatively, the user's computing device 103 can have an Internet browser program which can access a user portal to communicate with the loan system server 101. The user computing device can have a login screen to access the user's data stored on the loan system server 101.

Users can use the app software on the computing device 103 to take out loans from a loan system server 101 to pay a merchant or service provider for goods or services at a point of sale (POS) computing device 105 which can communicate with a merchant server 107. The user can receive the goods or services and the user's computing device 103 can instruct their bank or other financial source 109 to make payments to the loan system server 101 to pay off the loan for the received goods or services. In general, the loans can be configured with payments made to the loan system server 101 on specific time intervals such as monthly (or other time increment) payments from the financial source 109 which can be a bank. The financial source 109 can be instructed to make scheduled payments on designated dates from the users account by utilizing and actuating auto pay (or future pay) payment controls on the user's mobile computing device 103. The auto pay can use financial information such as checking account, savings account, or debit card as a source of funds for the financial source 109 to pay the loan server 101.

In traditional credit card system, the loan server can be a credit card company (e.g., VISA, MasterCard, Discover) and the scheduled payments for the loan can be automatically made from the financial source 109 (user's bank) to the credit card company loan server. However, problems can arise when there are insufficient funds at the financial source 109 to make the payments to the credit card company's loan server. If there are insufficient funds at the financial source 109 the scheduled payment is not made and there can be financial penalties for insufficient funds for the user from both the financial source 109 and the credit card company's loan server.

The present invention is directed towards systems and methods for processing payments to a loan server 101 from a financial source 109 when a scheduled auto pay or future pay payment fails that avoids the financial penalties for insufficient funds in the financial source 109 for the system user. In contrast to these traditional repayment methods that charge late fees when there is a payment failure, the inventive system loan server 101 can automatically reschedule a payment on a day when the consumer is more likely to have assets needed to pay the originally scheduled payment. As long as the payment failure to the loan server 101 is corrected within a predetermined period of time, there may not be any financial penalties from the loan server 101 or the financial source 109 for insufficient funds for the user.

In an embodiment, the system server 101 can transmit a confirmation message to the system user's computing device 103 via email (or other communications SMS, Text message, etc.) to inform the user that the system plans to retry the payment on a designated date through a specific financial instrument so that the users can provide the funds or correct the payment error before the retry date.

As discussed, when auto pay or future pay payments fail, traditional loan payment systems do not retry the payment, regardless of the failure reason. In contrast with reference to FIG. 2, the inventive payment system can transmit a payment failure notification message 120 from the system server to the customer user computing device which can specify that there was trouble processing an <amount> 121 of a payment scheduled for payment on a <date> 123 with <payment method info> 125 which can provide additional details about the payment method failure. The message 120 can also indicate that the payment will be retried on <date> 127 and a button 129 that can allow the user to cancel the retry payment.

When there is a payment failure, the loan server can transmit a payment failure notice to the buyer's computing device and provide response options which can be displayed on a user interface. The system loan server can allow the user to setup an "autopay" feature which allows the system loan server to receive payments form the user's financial source such as a bank. There are several potential outcomes to the payment failure notice including: 1. the consumer can respond to the payment failure notice, 2. The customer can ignore the failure notification with auto retry activated, and 3. The customer can ignore the failure notification with auto retry deactivated. More specifically, 1. If the consumer responds to the payment failure notice by manually authorizing the retrying the payment with same payment instrument or other payment instrument through a user interface of the user computing device which is transmitted back to the loan system server which can then reschedule the payment retry with the financial source for the system user. 2. If the customer ignores the failure notification and if the AutoPay feature of the payment system was not disabled, the system server will retry to obtain the fee payment at a later date such as the next month. The customer must still make the missed payment through a finance source to the system server to stay current on the repayment plan. However, if the repayment is not made, the customer will be overdue on loan payments and the system server can charge the customer with late payment fees which can be displayed on the user interface of the user's computing device. 3. If the customer ignores the failure notification and if the AutoPay feature was disabled by the user or due to payment account failure (e.g. bank account closed), the customer payment will remain overdue and the system server can charge the customer with late payment fees.

Figure 3:
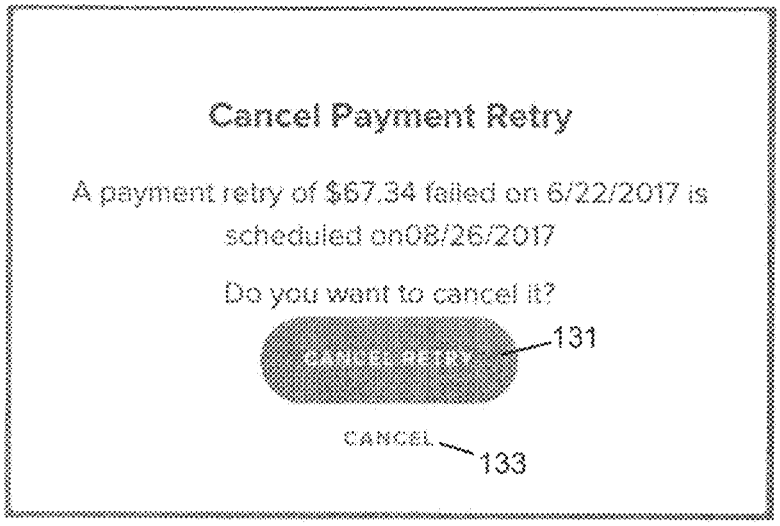
FIG. 3 illustrates an embodiment of a user interface on a computing device showing a payment retry failure message.

The system server can transmit various messages to the users' computing devices to provides information about the payment retries and the next scheduled retry payment attempts. With reference to FIG. 3, the system server can transmit a message to the user's computing device to give the user the option of canceling a payment retry. In this example, the payment retry of $67.34 failed on Jun. 22, 2017 and this payment retry is scheduled for Aug. 26, 2017. The message asks the user, "Do you want to cancel it?" and the user can press the "Cancel Retry" button 131 or the cancel button 133 which can become a button and can be pressed to cancel the cancel retry.

The national automated clearinghouse association (NACHA) develops operating rules and business practices for the network of automated clearing houses (ACH) networks. The ACH card networks (e.g. Visa and MasterCard) allow merchants and lenders up to two electronic payment retries if the payment failed due to "retry errors" associated with cards and ACH. The retry errors associated with cards can include: card not honored, insufficient funds, invalid amount, withdrawal count limit exceeded, etc. Errors resulting in a loan payment failure associated with ACH can include insufficient funds and the system could not process payment errors.

With reference to FIG. 1, the inventive system loan server 101 can be used with the ACH card networks that allow payment retries from financial sources 109 for these types of loan payment failure because the customer has already agreed to make the payment, and intended to make the payment as input through the user interface of the user's computing device 103.

In an embodiment, the loan server 101 can retry a payment from a client's financial institution sources 109 on a Friday that is at least three days after the prior scheduled payment failure. For example, if a payment failure from the financial institution sources 109 to the loan server 101 occurs between a Friday and the following Monday (4 days later) ending at 12 AM Coordinated Universal Time (UTC), the payment retry by the loan server 101 to the financial institution sources 109 will occur on the first following Friday and if the payment failure occurs on Tuesday, Wednesday or Thursday, the payment retry will occur on the second following Friday which is the Friday of the following week from the failure date. Using specific calendar dates, if the payment failure occurs between a Friday, Jan. 4, 2019 and the following Tuesday, Jan. 8, 2019 then the first retry date will be Friday, Jan. 11, 2019. If the payment failure occurs on Wednesday Jan. 9, 2019 or Thursday, Jan. 10, 2019 then the first retry date will be the following Friday, Jan. 18, 2019 (not the first Friday, Jan. 11, 2019).

If the payment retry from the financial institution sources 109 to the loan server 101 is successful, the system loan server 101 will not charge the user for late payment fees for the payment delay. This example of the repayment process can result in the payment retry being 3 to 10 days from the payment failure, which can provide enough time for the customer to correct the payment and possibly provide more funds to the user's financial institution 109.

This loan server 101 payment retry process can be friendlier to users than current payment failure procedures, which may immediately charge the customer late fees. These friendly no fee automatic payment retries can benefit both customers and businesses. For example, this improved no fee repayment method can result in an improved consumer payment success rate. Repayments that consumers make within 5-10 days of a failure notification can increase the successful repayment rate and result in higher customer satisfaction. In research studies, retried payment success rates can be greater than 70%. Thus, out of 100 payment retries after payment failures, there can be 70 or more successful payments and 30 or less unsuccessful payment retries due to insufficient funds (NSF) and/or other reasons. NSF is a general payment processing error code that is transmitted from a financial institution to the system server when there are insufficient funds available in a bank account. NSF errors can apply to both payments made by debt card and bank account (ACH). Other examples of failures: a bad account number, the customer disabled debits from their bank account, debit card expired, debit card closed, etc. However, in an embodiment, only the failure reasons listed in the spec result in a payment retry such as card not honored, insufficient funds, invalid amount, and withdrawal count limit exceeded. The described extended time repayment process also does not decrease autopay enrollment of consumers.

While the general loan payment retry has been described, in different embodiments the retry process can occur when a specific set of conditions occur. The following conditions can be determined by the system which will cause the system to schedule a payment retry: 1. The failed transfer of funds for the purchase was initiated via an AutoPay or a scheduled payment. 2. The system servers have only retried a fund transfer once and not retried transfer of funds for the purchase before which would be a second attempt. 3. The failed transfer of funds for the purchase occurred within a predetermined time period for example such as the past 16 days. This predetermined time limitation can be a rule defined by credit card company policies. For example, credit card companies such as MasterCard and Visa can specify that a payment correction can be applied within 16 days. In this example, if there 3 conditions are applicable, then the loan server 101 can perform the described payment retry method.

In different embodiments, the retry process that can have method steps for associated with specific payment services. The system server may have a slightly different retry payment processes for different payment services. For example, Stripe is a well-known payment processing system. www.stripe.com The system can attempt to process the payment through a payment system server 101 such as Stripe. If there is a loan payment failure, the payment system server 101 will transmit an error code message transmitted to the user's financial institution 109 indicating the type of error that caused the payment failure. For example, the Stripe payment system server 101 can respond to a payment failure by transmitting error codes including: 1. do_not_honor, 2. insufficient_funds, 3. invalid_amount, and 4. withdrawal_count_limit_exceeded. 1. do_not_honor can mean that the card has been declined for an unknown reason. There is a different reason from "stop payment" and "stolen card" that results in a hold being placed on the card. 2. insufficient_funds—This error code can be received when there are insufficient funds to pay the amount due.

3. invalid_amount—This error code can be received from the original failed payment and does not mean there was a difference between the retry and original payment amount. This code can mean that the payment amount is invalid, or exceeds the amount that is allowed. The system can result in the suggested resolution, if the amount appears to be correct, the customer needs to check with their card issuer to confirm that they can make purchases of that amount.

4. withdrawal_count_limit_exceeded—This is error code is similar to insufficient funds. The customer has exceeded the balance or credit limit available on their card. Based on the definition, the "amount" is directly tied to the available account balance rather than the number of withdrawals.

In another example, an ACH type payment system server 101 can respond to a payment failure by transmitting error codes including: 1. Insufficient_funds—This error code can be received when there are insufficient funds to pay the amount due. 2. could_not_process—this error code can occur when something unexpected went wrong and the customers bank was unable to process the payout.

The global "insufficient funds" error code limit can occur under certain conditions. For example, if a single instrument (i.e. a credit card) has three "insufficient funds" errors within a rolling predetermined time period, such as a 12 month period, the payment retry for the loan associated with this instrument should not be retried by the financing server 101. To be explicit, even if the three payment failure errors occurred on three separate loans, the system financing server 101 shouldn't retry that payment instrument again. This should apply even if the instrument was removed and added back again. Thus, this retry block would apply to the instrument.

If the user, across all their instruments, has four payments and/or payment retries that have resulted "insufficient funds" in a rolling predetermined time period, such as a 12 month period, the system financing server 101 may not retry to obtain the retry payment on any of the user's financial instruments until the rolling predetermined time period has expired. Thus, this retry block would apply to the user client.

The inventive retry payment system can be based upon certain researched characteristics of consumers which are most likely to result in successful payments. A first consideration is when should a retry payment be scheduled. As discussed above, the retry payments can be scheduled for Fridays. Research has shown that Friday is overwhelmingly the date the most customers pay back loans and a common payday for system users. In addition to scheduling the payment retry on a Friday, the system may also want to ensure that customers have ample time in order to provide funding or cancel their payment retries.

In different embodiment, the system financing server 101 has a memory storing a set of rules which can be applied to the retry payment conditions and schedule. In an embodiment, if a payment from the financial institution sources 109 to the loan service server 101 fails, the service server 101 can schedule the retry on the closest Friday in the future if this Friday is at least three days in the future of the payment failure. So, if the payment failure is on a Friday, Saturday, Sunday or Monday then the payment retry date will be the following Friday. If the closest Friday is less than three days in the future (i.e. Tuesday, Wednesday or Thursday), the system financing server 101 can schedule the retry payment from the financial institution sources 109 for the following Friday that can be the Friday of the following week. To be explicit, if payments fail after 12:00 am UTC on Tuesday (or Wednesday or Thursday), the system financing server 101 will not schedule the payment retry on the Friday immediately following the payment failure day of that week and will schedule the retry payment for the Friday of the next week.

While the payment retries have been described as occurring on Fridays, in other embodiments, the system financing server 101 can be configured to perform payment retries on different dates than Fridays. In a first example, the system financing server 101 can be configured to perform payment retries on the days that users are paid by their employers which is typically on the 15$^{th}$ day and the last day of the month. When there is a payment failure from the financial institution sources 109 to the system financing server 101, the retry system can be set to perform retry payments on the following 15$^{th}$ day or the last day of the month after the original scheduled payment date when the system user is likely to have additional funds. However, if the closest 15$^{th}$ day of the month is less than three days in the future from the scheduled payment date that failed, the system financing server 101 can schedule the retry payment for the following last day of the month. Similarly if the closest last day of the month is less than three days in the future from the payment failure date, the system financing server 101 can schedule the retry payment for the following 15$^{th}$ day of the following month. This embodiment can be applied to a specific calendar example. If the failed payment attempt is on the last three days of the month, for example Jan. 29, 30 or 31 then the system financing server 101 will retry processing the payment from the financial institution sources 109 to the system financing server 101 on the 15$^{th}$ day of the following month, February 15. If the failed payment attempt is before the 11$^{th}$ day of the month, for example between February 1 and February 10, then the system financing server 101 will retry processing the payment on the 15$^{th}$ day of the month, February 15. If the payment attempt is between the 12$^{th}$ day of the month and the 3$^{rd}$ to the last day of the month, for example between January 12 and January 28, the system will perform a payment retry on the last day of the month, January 31.

In other embodiments, the system financing server 101 can be configured to perform payment retries on the dates that correspond to the scheduled employee payment dates. In an embodiment, the system financing server 101 can communicate with application software running on the client computing device 103. The software can have a user interface which allows user to input their employer payment information so that the system financing server 101 retries will occur on employer payment dates.

Figure 2:
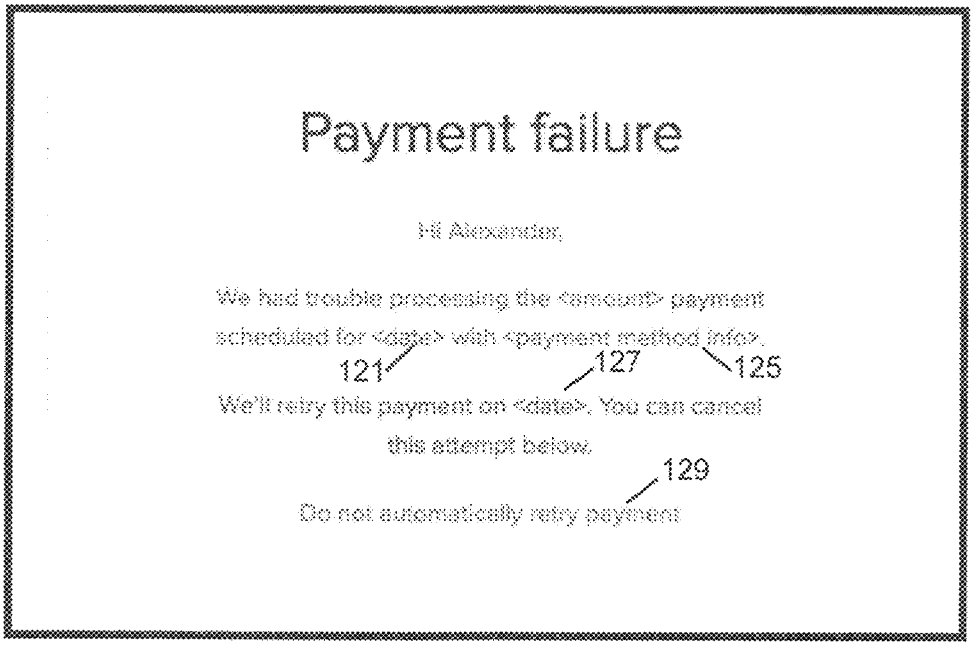
FIG. 2 illustrates an embodiment of a user interface on a computing device showing a payment failure message.

With reference to FIG. 2, user interfaces on mobile computing devices are illustrated which shows a payment failure message after a payment failure occurs and a payment retry is scheduled. With reference to FIG. 2, the system server sends the customer's computing device a new version of the "payment failure" (email and SMS) notification that informs the customer Alexander that the system financing server could not process a <amount>119 payment scheduled for a past scheduled payment <date>121 with a <payment method info.>125 which can be a bank funds transfer or other payment means. The message also states that the system server will be retrying the payment on <date>127 and instructs the user on how to cancel this retry through the user interface of the user's computing device by pressing the "Do not automatically retry payment" button 129.

In an embodiment, the user interface on the user's computing device can display a retry cancel button. In FIG. 2, the cancel button is listed as, "Do not automatically retry payment" button 129. The cancel button can be in the agent portal, user portal, and apps. The retry date for retrying to receive payments from a financial institution server to a financing server may be canceled by a user through the user interface cancel button on the user's computing device, until the time the batch process on the retry date has started. In an embodiment, the financing server can remove the retry cancel button from the user interface just before the batch has started on the date the retry will be processed. The financing server can cause the user interface on the user's computing device to remove the ability to "Cancel" to ensure that customers aren't confused.

In other embodiments, the financing server can perform various other actions to prevent errors in the payment retries. For example, if the outstanding balance is less than the retry payment amount, the financing system server can cancel the retry payment attempt from the financial institution server before the batch processing of funds transfers is run. The financing system server may not retry for a payment amount of the retry payment amount is different than the original payment amount per rules of the payment networks. This situation can be problematic because if the payment being retried was larger than the remaining balance of the loan, a partial but insufficient payment can be made since the retry amount is different than the original payment amount. This situation may also occur if there was a refund due to a returned product which may result in a refund.

If there was a retry payment is made successfully or pending state on the loan after the original payment was created, the payment retry should not be run. If there was a successful payment after the payment retry was scheduled the financing system server will immediately cancel the scheduled retry payment. If "pending" (for ACH payments), the financing system server will wait to see if the payment was successful and if the payment is successful, the financing system server will immediately cancel the corresponding payment retry. If the payment is still pending at the time the payment would be retried, the financing system server can also cancel the retry. This will ensure that customers don't overpay even when their retry payment is turn on.

In an embodiment, on the date of a retry, retries can be processed by the financing system server before scheduled payments and before autopay is processed. This order matters because if autopay runs first, it could decrease the outstanding balance to a point where the retry amount will not match and the financing system server wouldn't be able to submit the missed payment retry.

In some embodiments where the financing system server is used with other third payment platforms, when processing payment retries, these may need to be submitted to t h e third payment platforms such as Stripe via separate batches. The system can also be required to set the suffix, end of Company Entry Description, as "RETRY PYMT". This may be communicated to the third parties via an API. Both of these processes can be requirements from the ACH processing network NACHA. These requirements are applied to the system server card payments as well. Details of these requirements are described in Subsection 2.12.4.2, "Formatting Requirements for Reinitiated Entries—2017 NACHA Rule Book."

The financing system server can send the customer's computing device, the normal status information when processing retry payments which can include: success, processing, failed or other user communications messages. The status message(s) can display the normal payment status values in the user interface of the agent/consumer portals and app running on the user computing device.

In some embodiments, special conditions may apply to the financing system server processing. For example, if there are multiple retries scheduled for the loan or the user, but this shouldn't be common and shouldn't affect the described system processing implementations. When the original repayment attempt fails, the financing system server can transmit a repayment payment failure data message to the client computing device wherein the payment failure data includes a payment failure message, a second repayment attempt day and a cancel second repayment button on the display of the client computing device. The system may be configured to proceed with second retries if the first retry fails. For example, the financing system server can reschedule a second repayment attempt day from the payment service server to the finance server wherein if the payment failure day is a Saturday, a Sunday, a Monday, or a Tuesday, the second repayment attempt day is a first Friday immediately following the payment failure day and if the payment failure day is a Wednesday, a Thursday, or a Friday, the second repayment attempt day is Friday of a week following the payment failure day.

With reference to FIG. 3, an example of a message to a user's computing device is illustrated which informs the user that the payment retry of $67.34 failed on Jun. 22, 2017 and the second payment retry is scheduled for Aug. 26, 2017. The user can click on the cancel retry button 131 to instruct the cancel the second payment.

In an embodiment, the financing system server may detect or be informed by the financial institution that the payment instrument that will be used for the payment retry was removed from service or activity. If the payment instrument is removed before the batch process has started on the date of the retry, the financing system server cancels the scheduled payment retry for the payment instrument and does not proceed with the retry payment process attempt. The financing system server can send a message to the user's computing device that the payment retry has been canceled.

In an embodiment, the outstanding balance of loan might be greater than $0, but less than retry amount. This situation can occur if a partial payment to the outstanding balance has been made. The financing system server respond to this condition by sending a retry canceled message to the client computing device: This canceled message shouldn't be sent until the date that the retry payment is actually scheduled to run.

In an embodiment, the outstanding balance of loan might be $0. When this condition is met, the financing system server does not send a user communications. This balance check should be done by the financing system server on the day that the retry is scheduled for. If the check is done prior to that day, the balance could be $0 with a pending ACH payment that could still result in a retry payment failure. If the balance is $0 with a pending ACH payment on the day the retry is scheduled, the system will need to cancel as it normally would.

In an embodiment, the "global retry limit" can be reached when certain conditions are met. These conditions can be variable and set by the financing system server. In an embodiment, there can be two types of retry limits: 1, users payment instrument retries (for example, 3 per 12 months) and 2. user level retries (for example, 4 per 12 months) which can be system configuration settings. For payment instrument retires, a user could have one retry on three different instruments and not hit the limit of 4 retries in 12 months. If a user has attempted a total of four retries across all of the user's payment instruments, then no additional payment retries will be scheduled by t financing system server.

In a case where two customers or users share the same payment instrument (for example, spouses with joint payment accounts), the joint retry limits can be based on a per customer basis. If a single instrument has three "insufficient funds" errors within a rolling 12 month period, the defective payment instrument should not be retried by the financing system server. To be explicit, even if the two payment failure errors occurred on three separate loans, the financing system server should not retry obtaining a retry payment through that payment instrument again. This retry limit should apply even if the instrument was removed and added back again. In other embodiments, the limits are adjustable based on a financing system server administrator discretion with the intent of minimizing a negative impact to the consumer. In the event a payment retry caused the consumer to overdraft with their bank account funds, it can be desirable to limit the number of times this would occur within a specific predetermined time window, for example a 12 month window.

Similar, the financing system server can have checks in place to prevent the financing system server from creating a retry in the first place. These non-starter situations could arise that other payments failed after the retry was created. If the user, across all their instruments, has four payments retries that have result "insufficient funds" in a rolling 12 month predetermined time period, the system should not retry on any instrument until the predetermined time period has expired without exceeding the predetermined maximum number of retries. When these conditions occur, the financing system server can send a retry canceled message to the system user explaining that the cancelation was due to exceeding the maximum number of payments retries that have result "insufficient funds" in a rolling predetermined time period.

In some embodiments, the financing system server can implement retry safety features. For example, the system operations should not negatively impact system users or trigger "insufficient funds" that could result in overdraft fees. If the payment instrument has failed payment with the code "insufficient funds" within 2 days before the financing system server is scheduled to run the payment retry. The financing system server can cancel the payment retry from the payment financial institution server. Again, when this occurs, the financing system server can send a retry canceled message to the user's computing device with an explanation that the insufficient funds code was received within 2 days before the financing system server is scheduled to run the payment retry.

The financing system server can allow users the ability to cancel a retry if they desire through the user interface on the user's computing device. In different embodiments, the system can have a cancel retry button in a user interface so that the system users can easily actuate a cancel retry through the user portal and user interface on a apps running on a user computing device. In an embodiment, the user interface can display a date for a payment retry for a specific credit card number with a cancel button. If the user presses the cancel button, the user interface can display buttons for: a confirmation or the cancel the payment retry and a restoration of the payment retry. Once the confirmation of cancelation is pressed, the financing system server show the cancellation confirmation on the user interface. The user interface of the user's computing device can say "The following payment retry/retries have been canceled. Please make this payment as soon as possible."

If the outstanding balance of loan >$0, but less than scheduled payment retry amount, the financing system server can cancel the scheduled payment retry and transmit a message to the user's computing device, "We've canceled the following payment retry/retries because the retry amount is greater than your remaining loan balance. Please note that any remaining payments are still due on time. You can view your payment schedule." If payments have been made to the outstanding loan, the the financing system server can cancel the scheduled payment retry and transmit a message to the user's computing device, "The following payment retry/retries have been canceled because there was another payment made toward this loan. Please note that any remaining payments are still due on time. You can view your payment schedule."

If the user has reached a global limit of missed payments and/or payment retry safety conditions, the financing system server can cancel the scheduled payment retry and transmit a message to the user's computing device, "We've canceled the following payment retry/ies based on the errors the system received from your previous failed payment(s). Please note that any remaining payments are still due on time. You can view your payment schedule."

Figure 4:
FIG. 4 illustrates an embodiment of a user interface on a computing device showing a payment retries canceled message.
Figure 5:
FIG. 5 illustrates an embodiment of a user interface on a computing device showing a payment retries canceled message.

In the event there are multiple cancelling of schedule payments and/or payment retries, the financing system server can cancel the scheduled payment retry and transmit a message to the user's computing device that lists date, value, identification numbers the canceled payment retries. With reference to FIGS. 4 and 5, examples of messages regarding cancelled retries displayed on a user interface of the user's computing device are illustrated.

In an embodiment, before the financing system server retries a failed payment, the financing system server will transmit a message to the user's computing device to let the user know information about the scheduled payment retry through email, text message, etc. In the event there are multiple failed payments scheduled to be retried, the message can display the payment details and the payment that will be retried first. If the user wants to cancel this retry, the message can instruct the user to can go to the user portal, app, or contact an agent of the financing system before the date that your payment retry is scheduled for.

Figure 6:
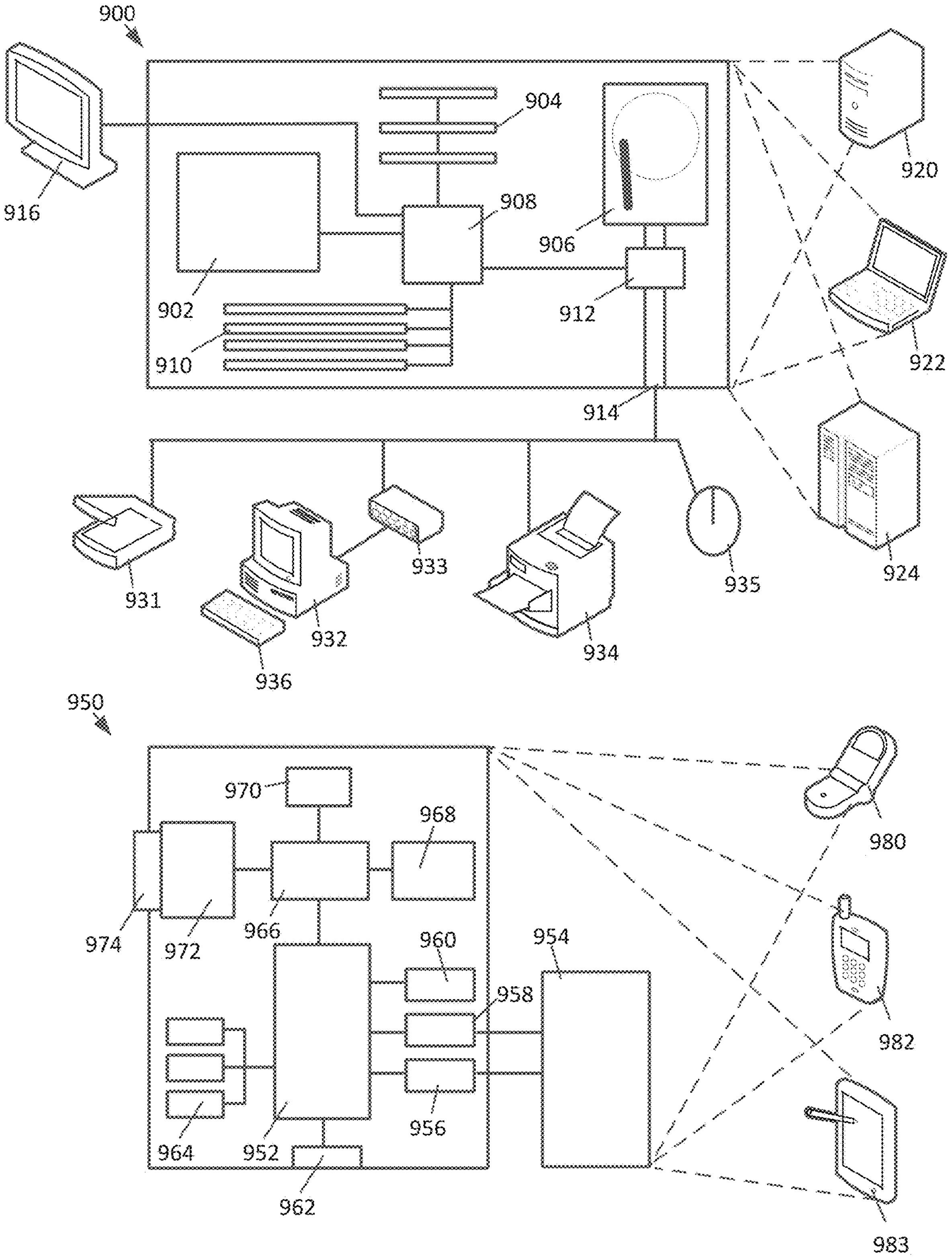
FIG. 6 illustrates a block diagram of a computer system for making purchase payments after payment failures.

FIG. 6 shows an example of a generic computer device 900 and a generic mobile computer device 950, which may be used to implement the processes described herein, including the mobile-side and server-side processes for installing a computer program from a mobile device to a computer.

Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid-state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. As a person skilled in the art will recognize from the previous detailed description and from the figures, modifications and changes can be made to the preferred embodiments of the invention without departing from the scope of this invention.

What is claimed is:

1. A server for managing payment rescheduling associated with a loan of a buyer to be repaid via a financial source associated with the buyer, the server comprising:

a memory storing a rule table and program instructions;

a high-speed communication interface operably coupling the server to an external communication port to enable the server to communicate with external devices including a buyer computing device and a financial source computing device via wired or wireless communication; and a processor configured to execute the program instructions and manage message processing for inbound and outbound messages via the high-speed communication interface, wherein the program instructions, when executed by the processor, configure the server to:

receive an inbound message from the financial source computing device providing notice of a failed payment on a failure date, the failed payment being a scheduled payment from the financial source associated with the loan, determine whether a payment retry condition is satisfied, determine a payment retry date based on the rule table in response to the payment retry condition being satisfied, and communicate the payment retry date as an outbound message to the buyer computing device via the external communication port, wherein the payment retry date is determined based on comparing a recurring predetermined preferred payment date to the failure date and selecting a next instance of the recurring predetermined preferred payment date that is greater than a minimum delay period from the failure date, wherein the notice from the financial source computing device of the failed payment includes an error code that indicates a type of error that caused the failed payment, wherein the program instructions include instructions to modify the communicating the payment retry date based on the error code, wherein the program instructions further configure the server to conduct a payment retry on the payment retry date via the financial source, wherein the program instructions further configure the server to check a status of the loan after the communicating the payment retry date and prior to the payment retry date, and cancel the payment retry based on the status of the loan, wherein the status of the loan indicates a change in a loan amount since the failure date, wherein the recurring predetermined preferred payment date is the 15th day of a month or a last day of the month, and wherein the minimum delay period is three days.

2. The server of claim 1, wherein the program instructions further configure the server to add the failed payment to a tracked number of prior failed payments associated with the loan to determine a total number of failed payments, wherein the payment retry condition comprises a retry limit, and wherein the payment retry condition is satisfied responsive to the total number of failed payments being less than the retry limit.

3. The server of claim 1, wherein the payment retry condition comprises the failed payment being determined to be associated with a scheduled payment or an autopay function.

4. The server of claim 1, wherein the payment retry condition comprises the failure date being within a predetermined time period.

5. The server of claim 1, wherein the recurring predetermined preferred payment date is Friday.

6. The server of claim 1, wherein modifying the communicating the payment retry date comprises including a suggested resolution to the buyer along with the payment reentry date.

7. The server of claim 1 wherein the program instructions include instructions to modify the determining the payment retry date based on the type of error that caused the failed payment indicated by the error code.

8. The server of claim 7, wherein modifying the determining the payment retry date comprises determining no payment retry date and canceling the communicating the payment retry date based on the error code.

9. The server of claim 1, wherein the rule table is constructed based on research regarding characteristics of consumers.

10. The server of claim 1, wherein the program instructions further configure the server to communicate with the financial source computing device to check a balance of an account of the buyer at the financial source after the communicating the payment retry date and prior to the payment retry date, and cancel the payment retry based on the balance of the account.

11. The server of claim 1, wherein the program instructions further configure the server to conduct a payment retry on the payment retry date via a first financial instrument associated with the buyer.

12. The server of claim 11, wherein the program instructions further configure the server to conduct an additional payment retry on the payment retry date via a second financial instrument associated with the buyer.

13. The server of claim 12, wherein the program instructions further configure the server to conduct a payment retry on the payment retry date, and schedule a subsequent retry date if the payment retry is not successful on the payment retry date.

14. The server of claim 13, wherein the program instructions further configure the server to limit a number of retries per payment instrument in a given period of time.

15. The server of claim 13, wherein the program instructions further configure the server to limit a number of retries in a given period of time.

* * * * *